Jan. 30, 1923.
P. B. FOUKE.
SMOKE PRODUCER.
FILED SEPT. 23, 1921.
1,443,464.
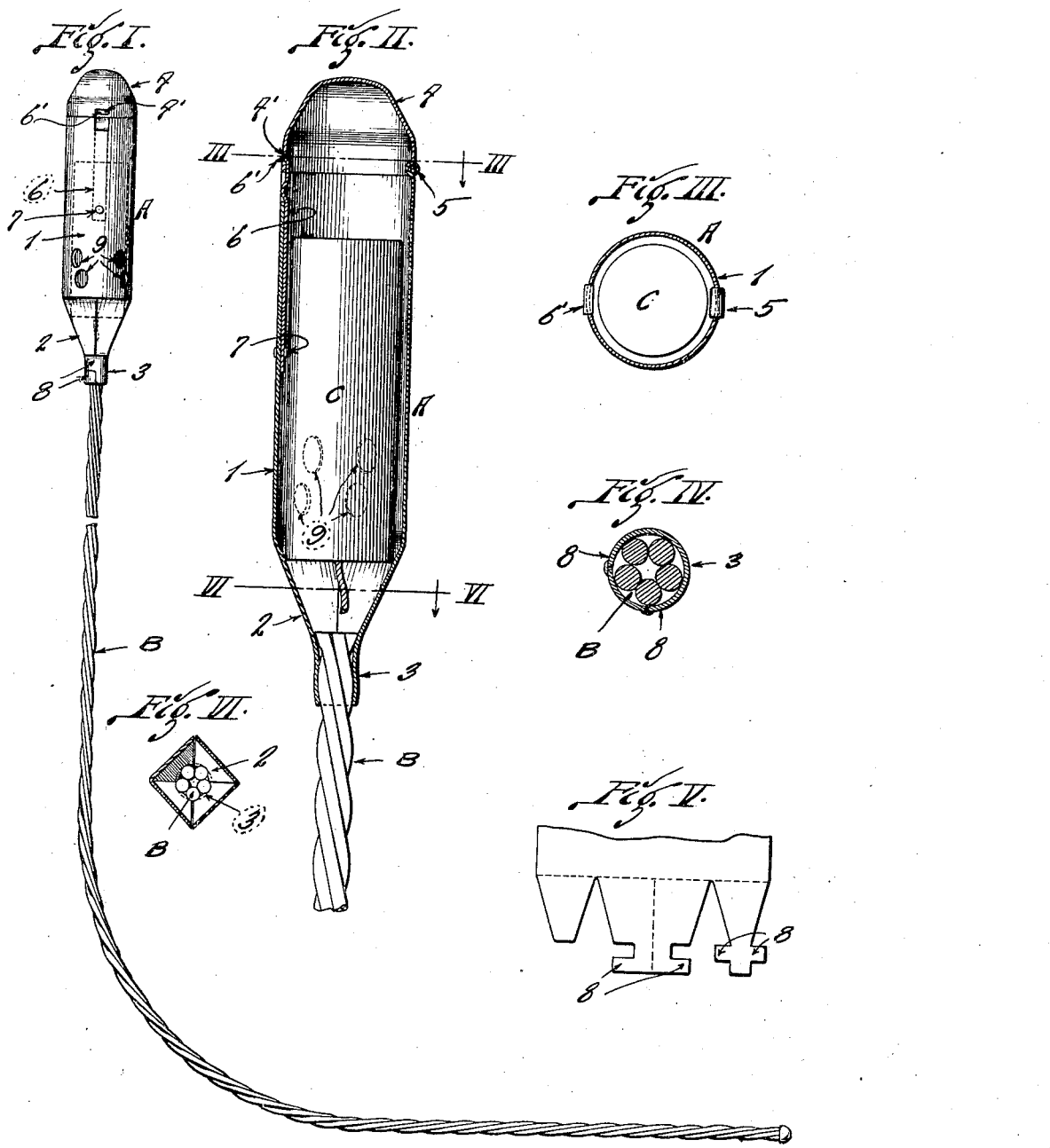
Inventor:
P. B. Fouke
By Cook & McCauley Attys.

Patented Jan. 30, 1923.

1,443,464

UNITED STATES PATENT OFFICE.

PHILIP B. FOUKE, OF ST. LOUIS, MISSOURI.

SMOKE PRODUCER.

Application filed September 23, 1921. Serial No. 502,692.

*To all whom it may concern:*

Be it known that I, PHILIP B. FOUKE, a citizen of the United States of America, a resident of the city of St. Louis, in the State of Missouri, have invented certain new and useful Improvements in Smoke Producers, of which the following is a full, clear, and exact description, reference being had to the accompanying drawings, forming a part of this specification.

This invention relates to improvements in smoke producers and particularly to a smoke producer adapted to be introduced into the dens of animals for the purpose of driving them out. Several devices similar to the one disclosed herein have been produced but in each deficiencies are present which prevent it from being entirely successful. My invention comprises a retrievable holder adapted to contain a smoke cartridge which when lighted emits suffocating smoke and fumes, which holder is inserted into the animal den where the cartridge will burn long enough to partially suffocate the animal and drive it out.

One object of my invention is to produce a holder in the use of which the fuse of the smoke cartridge will be prevented from coming into contact with the holder whereby the light may be snuffed out, and to prevent this I provide the cartridge holder with a fuse receiving space and a stop adapted to engage the cartridge so that the fuse cannot be forced into engagement with the walls of this space.

Another object of my invention is to provide the holder of my smoke producer with a catch which will not be accidentally actuated to unlock the cover of the holder when said holder is drawn along the ground or forced into the den of an animal.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modification which come within the scope of the claims hereunto appended.

Fig. I is an elevation of the smoke producer, a portion of the cable attached thereto being broken away.

Fig. II is a vertical section through the holder.

Fig. III is a section on line III—III of Fig. II.

Fig. IV is an enlarged horizontal section showing the manner of securing the cable to the holder.

Fig. V is a fragmentary view showing the lower portion of the sheet of which the holder is formed.

Fig. VI is a cross section on line VI—VI of Fig. II.

In the drawings A designates the cartridge holder of my smoke producer which comprises a hollow cylindrical main body portion 1 having a tapering, non-circular fuse-receiving portion 2 and a reduced lower end 3. This holder A is produced from a single sheet of material, the lower portion of which is shaped to form the tapering non-circular portion and the reduced end of said holder.

The upper end of the holder A is closed by a cover 4, which is preferably hinged to said holder A at the point indicated by the reference character 5 and is provided with a spring catch 6 secured to the holder at 7, the hooked end 6' of said spring catch being adapted to enter an opening 4' in the cover 4 whereby said cover is secured in a closed position.

It will be observed by referring to Fig. III of the drawing that the hinge member 5 and the spring catch 6 are comparatively wide whereby the danger of the cover 4 being displaced laterally from its seat on the upper edge of the holder is reduced, and also that the bowed portion 6ª of the catch 6 by which said catch is actuated to unlock the cover 4 is within the holder A, so the catch will not be accidentally actuated when said holder is being drawn along the ground.

Secured to the cartridge holder A at the lower reduced end thereof is a cable B of the desired length and flexibility. By referring to Fig. V of the drawing it will be observed that the reduced end 3 of the holder A is divided into a pair of portions and that each of said portions is provided with a pair of ears 8, one of which is at each end of said portion. It will also be noted that the ears on the different portions are not in the same vertical plane and that when said portions are bent to form a cylindrical sleeve, said ears would be located one above the other, as is shown in Fig. I. In securing the cable B to the holder A the portions which form the reduced end 3 are spread to admit the cable B, after which said portions are drawn tightly around said cable and the ears 8 caused to impinge tightly against said cable. Solder is then applied to the joint between said holder and cable whereby said joint is made doubly secure. While solder is preferably used it is to be understood that it is not entirely necessary to a secure joint between the holder and the cable, and if the solder should be melted by the heat of the burning cartridge the friction grip between said holder and said cable would remain secure.

The combustible material is preferably in the form of a cartridge C provided with a suitable fuse which is lighted before the device is inserted into the den.

To permit the escape of smoke arising from the combustion of the material contained within the holder A and to admit whatever air is necessary within the holder to support combustion therein, I provide said holder with a plurality of apertures 9.

The holder A, as has been stated, is provided with a non-circular fuse-receiving portion 2, the side walls of which converge toward the end of said holder. These side walls act as stops to limit the motion of the cartridge C in a direction toward the end of the holder A whereby the fuse of said cartridge is prevented from coming into contact with the end of the holder. In the device disclosed herein sufficient space is always maintained between the end of the cartridge and the end of the holder to permit free burning of the fuse of said cartridge, and because the cartridge C is circular in cross section and the fuse-receiving portion 2 of the holder non-circular, sufficient air may be drawn through the apertures 9 and around said cartridge and into the fuse-receiving portion of the holder to support combustion therein.

I claim:

1. A smoke producer comprising a cartridge holder adapted to contain a cartridge having a fuse, said cartridge holder being provided with a fuse-receiving end portion having an end wall facing the fuse of the cartridge, and said fuse-receiving end portion being provided with a plurality of side walls converging toward said end wall, said side walls forming stops to prevent the fuse of the cartridge from contacting with said end wall.

2. A smoke producer comprising a cartridge holder adapted to contain a cylindrical cartridge having a fuse, said cartridge holder being provided with a fuse-receiving end portion having an end wall facing the fuse of the cartridge, said end portion being non-circular in cross section and provided with a plurality of side walls converging toward said end wall, said side walls forming stops to prevent the fuse from contacting with said end wall, and a flexible cable secured to and extending from said end portion.

3. A smoke producer comprising a cartridge holder adapted to contain a cartridge having a fuse, said cartridge holder being provided with a fuse-receiving end portion having an end wall facing the fuse of the cartridge, said fuse-receiving portion being of different cross sectional shape than said cartridge whereby air may pass between the outside face of the cartridge and the inside face of the side wall of the fuse-receiving space.

4. A smoke producer comprising a hollow cylindrical main body portion having a reduced end and a tapering non-circular portion interposed between said main body portion and said reduced end, said main body portion being provided with a plurality of apertures formed in the wall thereof, a cable connected to said smoke producer at said reduced end, the material of said reduced end being split at diametrically opposite points whereby said reduced end may be spread to receive the cable and each portion of said reduced end being provided with ears adapted to impinge against the cable to secure said smoke producer to said cable, a cover hinged to said hollow cylindrical main body portion at the end opposite to the reduced end, and a catch for securing said cover in a closed position, said catch having operating means which lies wholly within said main body portion.

In testimony that I claim the foregoing I hereunto affix my signature.

PHILIP B. FOUKE.